(12) United States Patent
Oh et al.

(10) Patent No.: US 10,988,103 B2
(45) Date of Patent: Apr. 27, 2021

(54) KNEE AIRBAG APPARATUS FOR AUTONOMOUS VEHICLE AND METHOD OF CONTROLLING THE SAME

(71) Applicants: Hyundai Motor Company, Seoul (KR); KIA Motors Corporation, Seoul (KR)

(72) Inventors: Tae Oh Oh, Gyeonggi-do (KR); Jae Ho Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 106 days.

(21) Appl. No.: 16/380,379

(22) Filed: Apr. 10, 2019

(65) Prior Publication Data
US 2020/0164827 A1 May 28, 2020

(30) Foreign Application Priority Data
Nov. 26, 2018 (KR) ........................ 10-2018-0147347

(51) Int. Cl.
| B60R 21/02 | (2006.01) |
| B60R 21/233 | (2006.01) |
| B60R 21/239 | (2006.01) |
| B60R 21/013 | (2006.01) |
| B60R 21/015 | (2006.01) |
| B60R 21/04 | (2006.01) |
| B60R 21/205 | (2011.01) |
| B60R 21/217 | (2011.01) |

(Continued)

(52) U.S. Cl.
CPC .......... *B60R 21/233* (2013.01); *B60R 21/013* (2013.01); *B60R 21/01512* (2014.10); *B60R 21/01554* (2014.10); *B60R 21/04* (2013.01); *B60R 21/205* (2013.01); *B60R 21/217* (2013.01); *B60R 21/239* (2013.01); *B60R 21/26* (2013.01); *B60R 2021/0004* (2013.01); *B60R 2021/0009* (2013.01); *B60R 2021/0023* (2013.01); *B60R 2021/0032* (2013.01); *B60R 2021/0051* (2013.01); *B60R 2021/23169* (2013.01); *B60R 2021/23176* (2013.01); *B60R 2021/23324* (2013.01); *G05D 1/02* (2013.01)

(58) Field of Classification Search
CPC ........ B60R 21/206; B60R 2021/23169; B60R 21/231; B60R 2021/0051; B60R 2021/23107
See application file for complete search history.

(56) References Cited

U.S. PATENT DOCUMENTS

2015/0066308 A1* 3/2015 Nagasawa ......... B60R 21/01534
  701/45
2015/0197210 A1* 7/2015 Abe ...................... B60R 21/233
  280/729

(Continued)

FOREIGN PATENT DOCUMENTS

KR      20170008385 A      1/2017

*Primary Examiner* — Kenneth J Malkowski
(74) *Attorney, Agent, or Firm* — Brinks Gilson & Lione (57) ABSTRACT

A knee airbag apparatus for an autonomous vehicle, wherein a first cushion and a second cushion are deployed toward the knees of a passenger and a third cushion is deployed toward the feet and shins of the passenger according to a collision mode (head-on collision, offset collision or oblique collision) and a position (normal position or relaxation position) of a seat.

9 Claims, 6 Drawing Sheets (51) Int. Cl.
*B60R 21/26* (2011.01)
*G05D 1/02* (2020.01)
*B60R 21/00* (2006.01)
*B60R 21/231* (2011.01)

(56) References Cited

U.S. PATENT DOCUMENTS

2016/0311392 A1* 10/2016 Jindal .................. B60R 21/231
2018/0065581 A1* 3/2018 Ohno .................... B60R 21/231
2019/0039549 A1* 2/2019 O'Connor ......... B60R 21/01512

* cited by examiner

KNEE AIRBAG APPARATUS FOR AUTONOMOUS VEHICLE AND METHOD OF CONTROLLING THE SAME

CROSS-REFERENCE TO RELATED APPLICATION

This application claims the priority to and the benefit of Korean Patent Application No. 10-2018-0147347, filed on Nov. 26, 2018, the entire contents of which are incorporated herein by reference.

FIELD

The present disclosure relates to a knee airbag apparatus for an autonomous vehicle and a method of controlling the same, and, more particularly, to a knee airbag apparatus for an autonomous vehicle, which includes multiple cushions such that cushions used for different purposes are deployed according to the position of a seat and a collision mode, and a method of controlling the same.

BACKGROUND

The statements in this section merely provide background information related to the present disclosure and may not constitute prior art.

An autonomous vehicle is a smart vehicle which utilizes autonomous driving technology to allow a driver to travel to a destination without directly manipulating a steering wheel, an accelerator and a brake. Recently, autonomous vehicles have been rapidly developed.

When an autonomous driving situation is universally realized, the driver may select a driving mode in which the driver directly drives the vehicle and a relaxation mode in which the driver takes a rest without driving the vehicle.

In the driving mode, the position of a seat is located on the front side of a seat rail. At this time, the seat is located in a normal region. The normal region may mean a region from the front end of the seat rail to a predetermined distance therefrom toward the rear side.

In the relaxation mode, the seat is located in a relaxation region. The relaxation region is a region of the seat rail excluding the normal region and may mean a region from the end of the normal region to the rear end of the seat rail.

Meanwhile, when the seat is located in the relaxation region, a distance between a passenger seated on a seat and a crash pad is excessively large. Therefore, it is impossible to efficiently secure safety of the passenger using a conventional knee airbag.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure provides a knee airbag apparatus for an autonomous vehicle, which includes multiple cushions such that cushions used for different purposes are deployed according to the position of a seat and a collision mode and is capable of efficiently securing safety of both a passenger located in a normal region and a passenger located in a relaxation region, and a method of controlling the same.

In accordance with an aspect of the present disclosure, the above may be accomplished by a knee airbag apparatus for an autonomous vehicle including an inflator operated by an airbag controller to generate airbag gas, a first cushion deployed toward knees of a seated passenger by the airbag gas, a second cushion connected to the first cushion through a first vent hole, and a first active vent configured to close the first vent hole under the condition that only the first cushion is deployed and to open the first vent hole such that the second cushion is deployed with a time difference after deploying the first cushion under the condition that the second cushion is deployed.

The second cushion may be connected to the first cushion to face the seated passenger and is deployed toward the knees of the seated passenger when the first vent hole is opened.

The knee airbag apparatus may further include a third cushion connected to the first cushion through a second vent hole and a second active vent configured to close the second vent hole under the condition that the third cushion is not deployed and to open the second vent hole such that the third cushion is deployed under the condition that the third cushion is deployed.

The third cushion may be deployed below the first cushion and the second cushion to protect feet and shins of the seated passenger.

The airbag controller may be configured to receive signals from a collision detection sensor, a passenger detection sensor and a seat positioning mechanism and to control operation of the inflator, the first active vent and the second active vent.

The condition that only the first cushion is deployed may be a first condition in which a passenger is seated on a seat, head-on collision occurs, and a seat is located in a normal region.

The condition that the second cushion is deployed may be a condition satisfying any one of a second condition or a third condition, the second condition may be a condition in which a passenger is seated on a seat, head-on collision occurs, and a seat is located in a relaxation region, and the third condition may be a condition in which a passenger is seated on a seat, any one of offset collision or oblique collision occurs, and a seat is located in a relaxation region.

The condition that the third cushion is deployed may be a condition satisfying any one of a third condition or a fourth condition, the third condition may be a condition in which a passenger is seated on a seat, any one of offset collision or oblique collision occurs, and a seat is located in a relaxation region, and the fourth condition may be a condition in which a passenger is seated on a seat, any one of offset collision or oblique collision occurs, and a seat is located in a normal region.

The inflator may be fixed to a crash pad of a driver seat, the first cushion and the second cushion may be deployed toward knees of a passenger seated on the driver seat, and the third cushion may be deployed toward feet and shins of the passenger seated on the driver seat.

The inflator may be fixed to a glove box coupled to a crash pad of a passenger seat, the glove box may protrude inward by operation of a glove box lifter when the inflator inflates, the first cushion and the second cushion may be deployed toward knees of a passenger seated on the passenger seat, and the third cushion may be deployed toward feet and shins of the passenger seated on the passenger seat.

In accordance with another aspect of the present disclosure, the above may be accomplished by a method of controlling operation of a knee airbag apparatus for an autonomous vehicle including determining a first mode (head-on collision) or a second mode (offset collision or oblique collision) when a collision occurs in a state in which the vehicle starts and an airbag system is turned on, performing control to deploy only a first cushion or the first cushion and a second cushion according to a position of a seat when the first mode (head-on collision) is determined, and performing control to deploy the first cushion and a third cushion or the first cushion, the second cushion and the third cushion according to the position of the seat when the second mode (offset collision or oblique collision) is determined.

When the seat is located in a normal region in a state of determining the first mode (head-on collision), an inflator may operate by an airbag controller to perform control such that only the first cushion is deployed toward knees of a seated passenger.

When the seat is located in a relaxation region in a state of determining the first mode (head-on collision), an inflator may operate by an airbag controller to perform control such that the first cushion is deployed toward knees of a seated passenger and the second cushion is deployed toward the knees of the seated passenger as a first active vent operates with a time difference after deploying the first cushion.

When the seat is located in a normal region in a state of determining the second mode (offset collision or oblique collision), an inflator may operate by an airbag controller to perform control such that the first cushion is deployed toward knees of a seated passenger and the third cushion is deployed toward feet and shins of the seated passenger by operating a second active vent when the first cushion is deployed.

When the seat is located in a relaxation region in a state of determining the second mode (offset collision or oblique collision), an inflator may operate by an airbag controller to perform control such that the first cushion is deployed toward knees of a seated passenger, the second cushion is deployed toward the knees of the seated passenger by operating a first active vent with a time difference after deploying the first cushion, and the third cushion is deployed toward feet and shins of the seated passenger by operating a second active vent when the second cushion is deployed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a knee airbag apparatus for an autonomous vehicle and a method controlling the same will be described in detail with reference to the accompanying drawings.

When an autonomous driving situation is universally realized, a driver may select a driving mode in which the driver directly drives the vehicle and a relaxation mode in which the driver takes a rest without driving the vehicle.

In the driving mode, a seat is located on the front side of a seat rail. At this time, the seat is located in a normal region. The normal region may mean a region from the front end of the seat rail to a predetermined distance therefrom toward the rear side.

In the relaxation mode, the seat is located in a relaxation region. The relaxation region is a region of the seat rail excluding the normal region and may mean a region from the end of the normal region to the rear end of the seat rail.

One aspect of the present disclosure is characterized in that the knee airbag apparatus includes a plurality of chambers and the number and types of deployed chambers vary according to a collision mode (head-on collision, offset collision or oblique collision) and the position of a seat (whether a seat is located in the normal region or a relaxation region), thereby efficiently securing safety of both a passenger located in the normal region and a passenger located in the relaxation region.

As illustrated in FIGS. 1 to 6, the knee airbag apparatus for the autonomous vehicle according to the present disclosure includes an inflator 10 operated by an airbag controller 1 to generate airbag gas; a first cushion 20 deployed toward the knees 3 of a seated passenger 2 by airbag gas; a second cushion 30 connected to the first cushion 20 through a first vent hole 31; a first active vent 40 configured to close the first vent hole 31 under the condition that only the first cushion 20 is deployed and to open the first vent hole 31 such that the second cushion 30 is deployed with a time difference after the first cushion 20 is deployed under the condition that the second cushion 30 is deployed; a third cushion 50 connected to the first cushion 20 through a second vent hole 51; and a second active vent 60 configured to close a second vent hole 51 under the condition that the third cushion 50 is not deployed and to open the second vent hole 51 such that the third cushion 50 is deployed under the condition that the third cushion 50 is deployed.

The second cushion 30 is connected to the first cushion 10 to face the seated passenger 2 and is deployed toward the knees 3 of the seated passenger 2 when the first vent hole 31 is opened.

Figure 3:
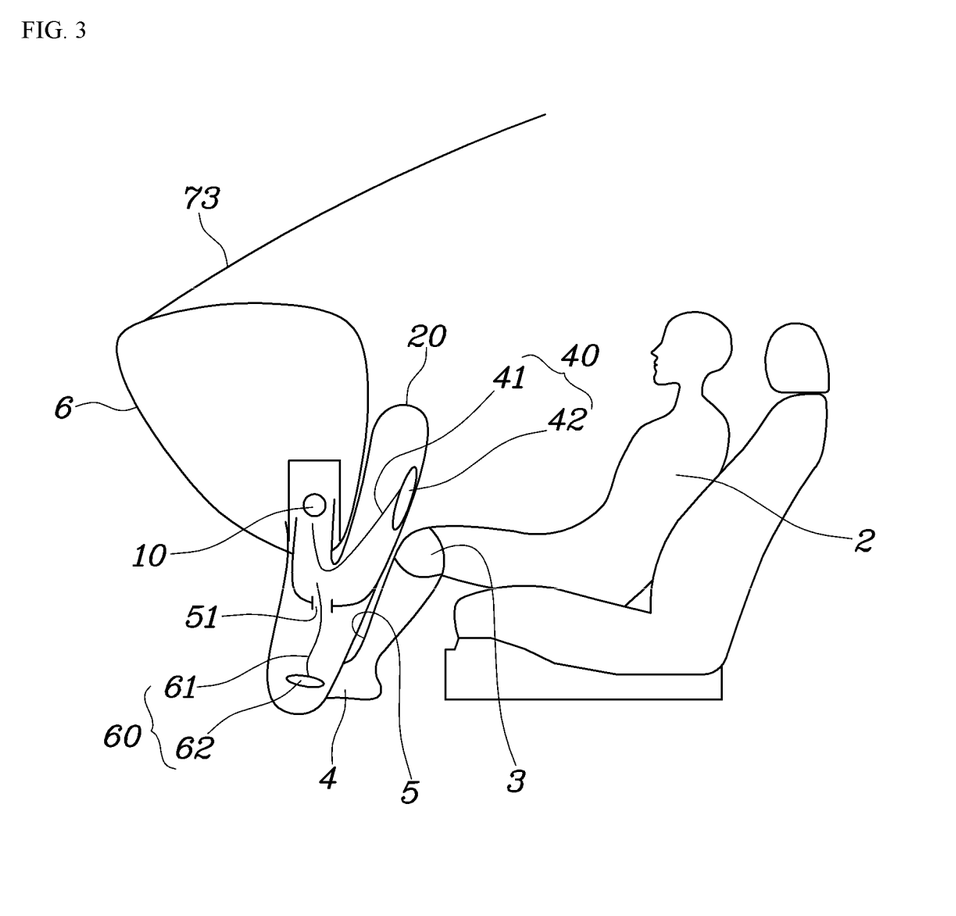
FIG. 3 is a view showing a state in which a first cushion and a third cushion are deployed.
Figure 4:
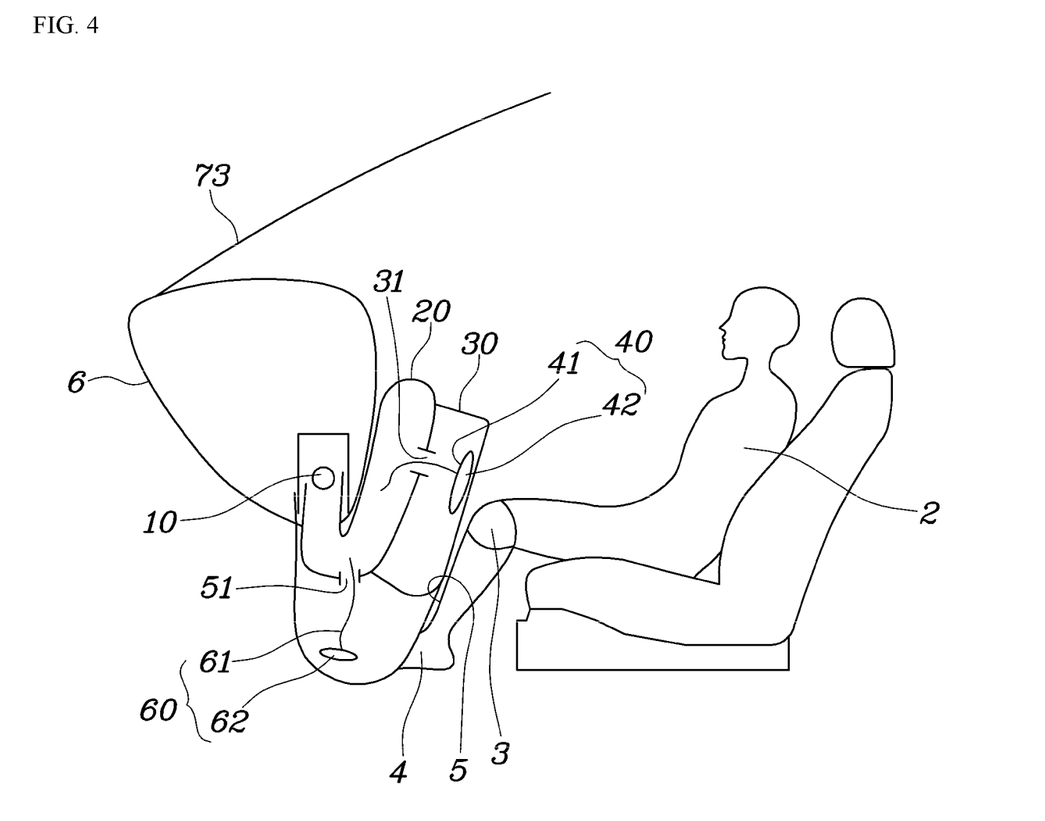
FIG. 4 is a view showing a state in which a first cushion, a second cushion and a third cushion are deployed.

The third cushion 50 is deployed below the first cushion 20 and the second cushion 30 to protect the feet 4 and shins 5 of the seated passenger 2.

FIGS. 1 to 4 show a knee airbag apparatus installed on a driver seat side. At this time, the inflator 10 is fixed to the crash pad 6 of the driver seat side, the first cushion 20 and the second cushion 30 are deployed toward the knees 3 of the passenger 2 seated on the driver seat, and the third cushion 50 is deployed toward the feet 4 and the shins 5 of the passenger 2 seated on the driver seat.

The airbag controller 1 is configured to receive signals from a collision detection sensor 7, a passenger detection sensor 8 and a seat positioning mechanism 9 and to control operation of the inflator 10, the first active vent 40 and the second active vent 60.

The collision detection sensor 7 includes a plurality of front impact sensors (FISs) and may determine head-on collision, offset collision or oblique collision using the FISs.

The passenger detection sensor 8 is used to determine whether a passenger is present on a seat and generally uses a passenger presence detector (PPD) using a piezoelectric device.

The seat positioning mechanism 9 is used to determine whether a seat moving back and forth along a seat rail is located in a normal region or a relaxation region and may generally use a seat traction position system (STPS), an image captured using a camera or an ultrasonic sensor.

The first active vent 40 includes a tether 41 such as a wire and a diaphragm member 42 connected to the tether 41.

Figure 1:
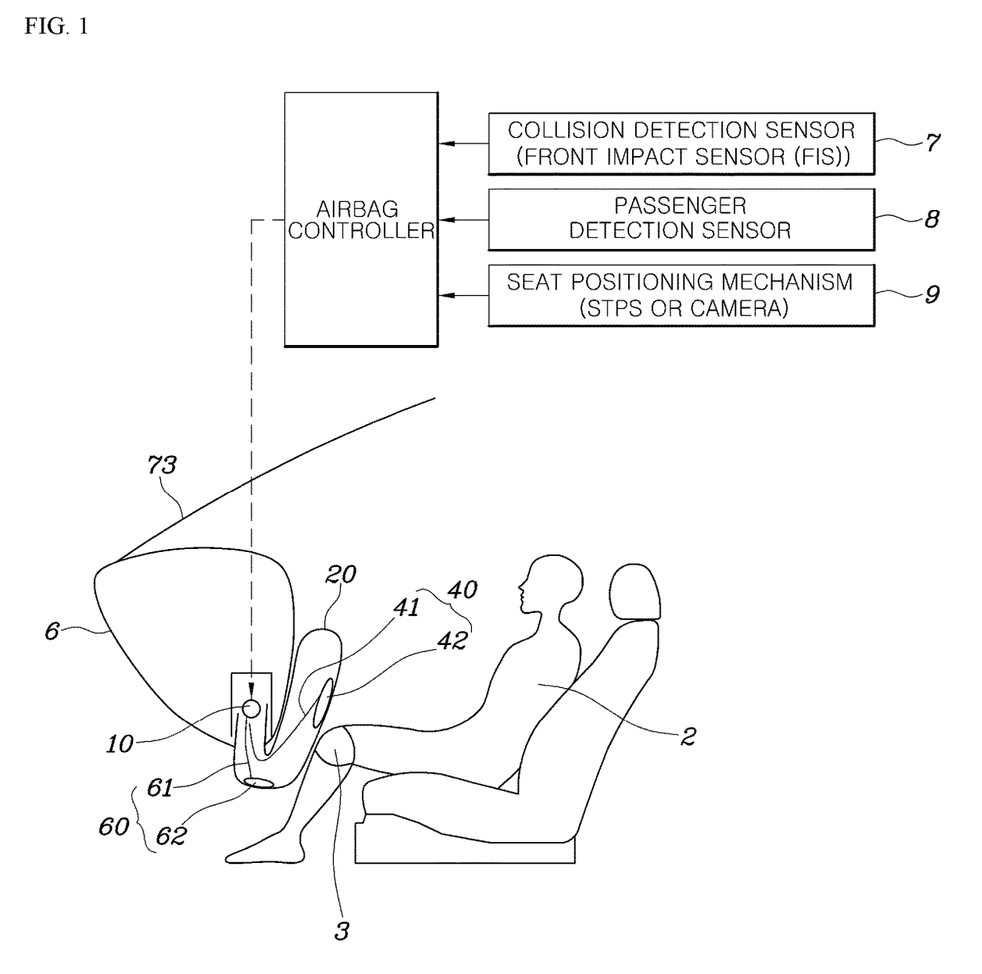
FIG. 1 is a view showing a state in which only a first cushion is deployed in order to explain a knee airbag apparatus for an autonomous vehicle according to the present disclosure.
Figure 2:
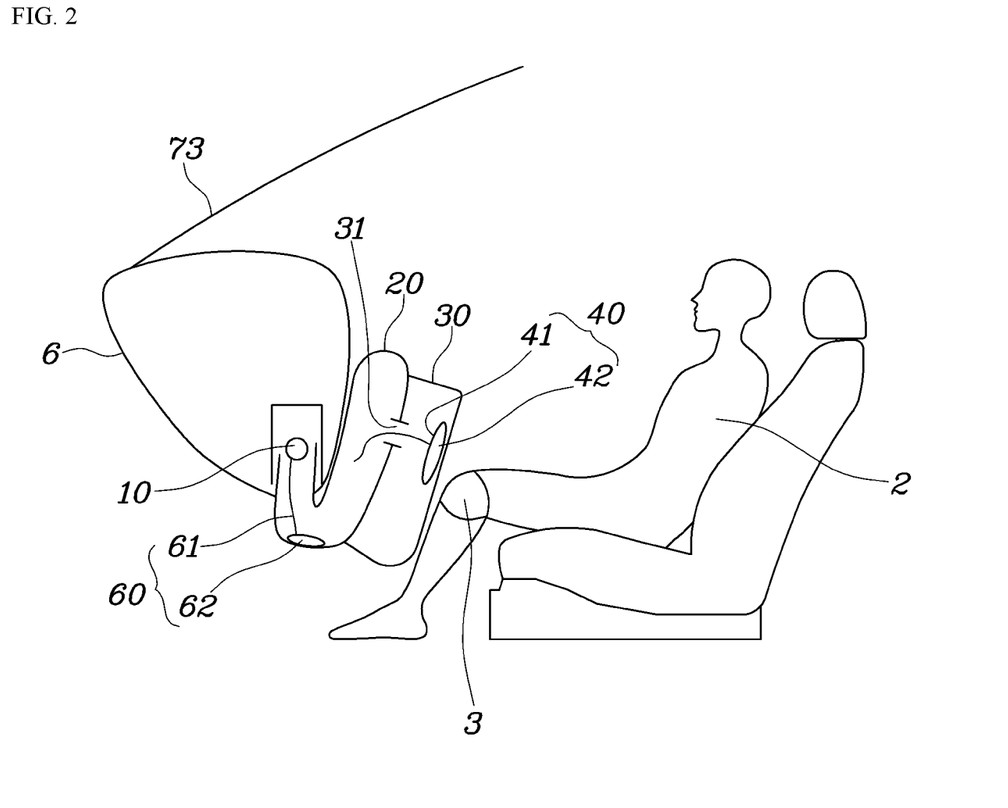
FIG. 2 is a view showing a state in which a first cushion and a second cushion are deployed.

The tether 41 is held tight when the first cushion 20 is deployed. When only the first cushion 20 is deployed as shown in FIG. 1 or 3, the diaphragm member 42 closes the first vent hole 31. When the first cushion 20 and the second cushion 30 are deployed as shown in FIG. 2 or 4, the tether 41 is cut by a cutter, the first vent hole 31 is opened by moving the diaphragm member 42 by the pressure of gas, and, due to opening of the first vent hole 31, the second cushion 30 is deployed toward the knees 3 of the passenger 2 with a time difference after the first cushion 20 is deployed.

The second active vent 60 also includes a tether 61 such as a wire and a diaphragm member 62 connected to the tether 61.

The tether 61 is held tight when the first cushion 20 is deployed. In the case of head-on collision as shown in FIGS. 1 to 2, the diaphragm member 62 closes the second vent hole 51. In the case of offset collision or oblique collision as shown in FIGS. 3 to 4, when the first cushion 20 is deployed, the tether 61 is cut by a cutter, the second vent hole 51 is opened by moving the diaphragm member 62 by the pressure of gas, and, due to opening of the second vent hole 51, the third cushion 50 is deployed toward the knees 3 and shins 5 of the passenger 2.

Figure 5:
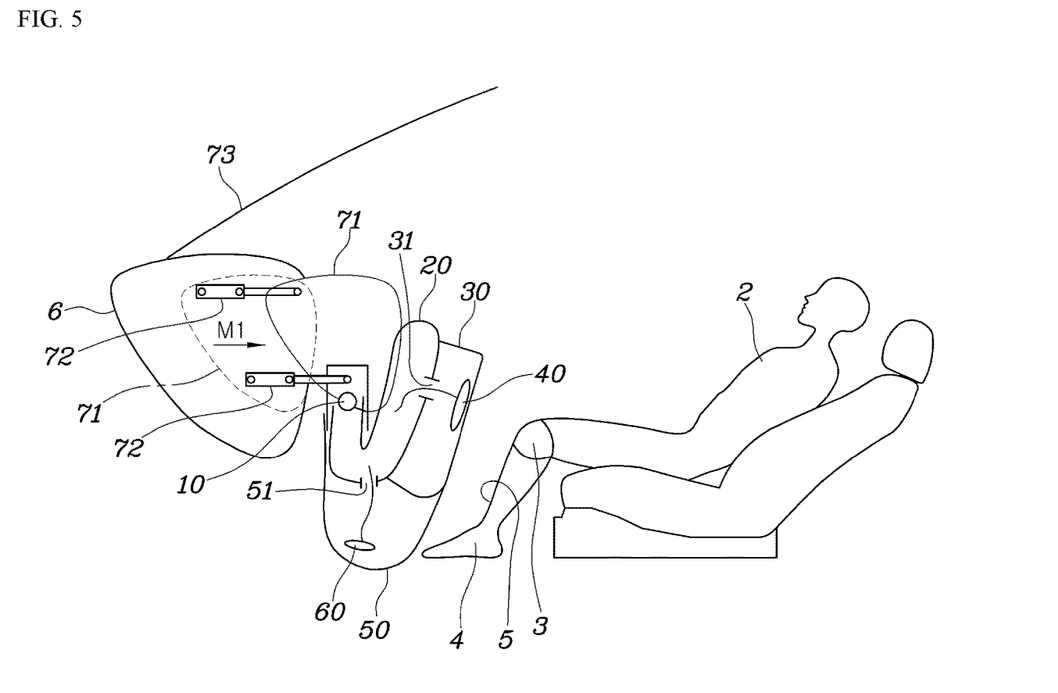
FIG. 5 is a view illustrating a structure in which a knee airbag apparatus for an autonomous vehicle according to the present disclosure is provided in a glove box coupled to a crash pad of a passenger seat.

The knee airbag apparatus according to the present disclosure may be installed on a passenger seat side as shown in FIG. 5. At this time, the inflator 10 is fixed to the glove box 71 coupled to the crash pad 6 of the passenger seat side. When the inflator 10 inflates, the glove box 71 protrudes inward by operation of a glove box lifter 72 (arrow M1), the first cushion 20 and the third cushion 30 are deployed from the glove box 71 toward the knees 3 of the passenger 2, and the third cushion 50 is deployed toward the feet 4 and shins 5 of the passenger 2 seated on the passenger seat.

In FIGS. 1 to 5, reference numeral 73 denotes a front windshield.

Figure 6:
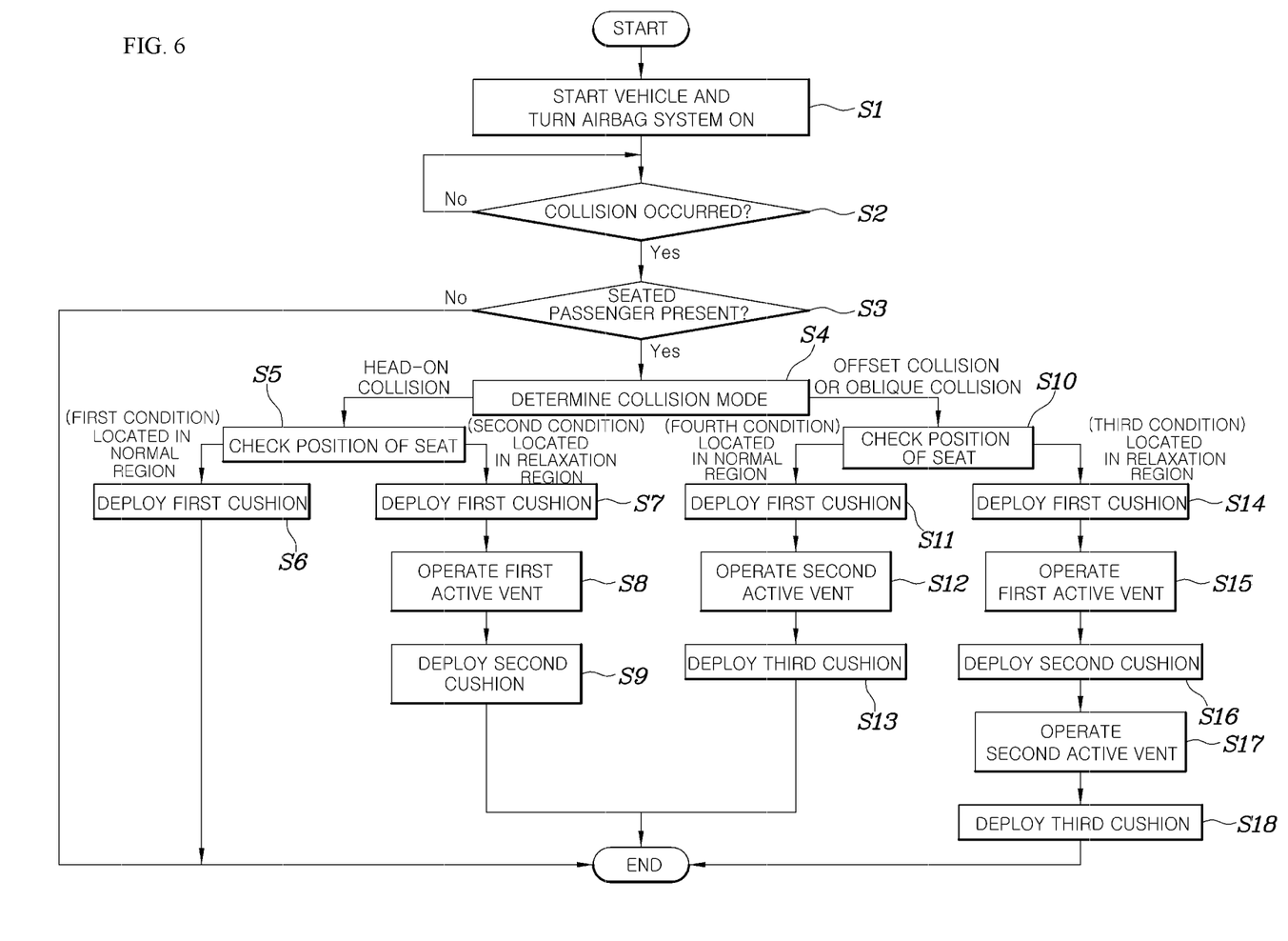
FIG. 6 is a flowchart illustrating a method of controlling a knee airbag apparatus for an autonomous vehicle according to the present disclosure.

A method of controlling a knee airbag apparatus for an autonomous vehicle according to the present disclosure will be described with reference to the flowchart of FIG. 6.

In a state in which a vehicle starts and an airbag system is turned on (step S1), whether a vehicle collision has occurred is determined using the signal of the collision detection sensor 7 (step S2). Upon determining that collision has occurred, whether a passenger is present on a seat is determined using the signal of the passenger detection sensor 8 (step S3). Upon determining that a passenger is not present on the seat, the logic ends and, upon determining that a passenger is present on the seat, the collision mode is determined using the signal of the collision detection sensor 7 (step S4).

The collision mode is roughly categorized into a first mode (head-on collision) and a second mode (offset collision or oblique collision). When a collision occurs, the first mode (head-on collision) is determined if the plurality of collision detection sensors 7 attached to the front side of the vehicle evenly generates signals and the second mode (offset collision or oblique collision) is determined if some sensors generate local signals.

First, if the first mode (head-on collision) is determined, the position of the seat is checked using the signal of the seat positioning mechanism 9 (step S5). The position of the seat is divided into a region from the front end of the seat rail to a predetermined distance therefrom toward the rear side, that is, a normal region, and a region from the end of the normal region to the rear end of the seat rail as a region of the seat rail excluding the normal region, that is, a relaxation region.

When the seat is currently located in the normal region in step S5, since a distance between the seated passenger 2 and the crash pad 6 is small, as shown in FIG. 1, the inflator 10 operates under control of the airbag controller 1 such that only the first cushion 20 is deployed toward the knees 3 of the passenger 2 (step S6).

In contrast, when the seat is currently located in the relaxation region in step S5, since a distance between the seated passenger 2 and the crash pad 6 is excessively large, as shown in FIG. 2, the inflator 10 operates under control of the airbag controller 1 such that the first cushion 20 is deployed toward the knees 3 of the passenger 2 (step S7), the first vent hole 31 is opened by operating the first active vent 40 with a time difference after the first cushion 20 is deployed (step S8), and the second cushion 30 is deployed toward the knees 3 of the passenger 2 with a time difference from the first cushion 20 through opening of the first vent hole 31 (step S9).

Meanwhile, when the second mode (offset collision or oblique collision) is determined in step S4, the position of the seat (the normal region or the relaxation region) is checked using the signal of the seat positioning mechanism 9 (step S10).

In the case of offset collision or oblique collision, the risk of injury to the lower body including not only the knees but also the feet 4 and the shins 5 of the passenger increases. Accordingly, in the case of the second mode (offset collision or oblique collision), the second cushion 50 may also be deployed.

That is, in the second mode (offset collision or oblique collision), if the seat is currently located in the normal region as the result of checking the position of the seat (step S10), since the distance between the seated passenger 2 and the crash pad 6 is small, as shown in FIG. 3, the inflator 10 operates under control of the airbag controller 1, such that the first cushion 20 is deployed toward the knees 3 of the passenger 2 (step S11), the second vent hole 51 is opened by operating the second active vent 60 when the first cushion 20 is deployed (S12), and the third cushion 50 is deployed toward the feet 4 and the shins 5 of the passenger 2 through opening of the second vent hole 51 (step S13).

That is, in the second mode (offset collision or oblique collision), if the seat is currently located in the relaxation region as the result of checking the position of the seat (step S10), since a distance between the seated passenger 2 and the crash pad 6 is excessively large, as shown in FIG. 4, the inflator 10 operates under control of the airbag controller 1, such that the first cushion 20 is deployed toward the knees 3 of the passenger 2 (step S14), the first vent hole 31 is opened by operating the first active vent 40 with a time difference after the first cushion 20 is deployed (step S15), the second cushion 30 is deployed toward the knees 3 of the passenger 2 with a time difference from the first cushion 20 through opening of the first vent hole 31 (S16), the second vent hole 51 is opened by operating the second active vent 60 when the first cushion 20 is deployed (S17), and the third cushion 50 is deployed toward the feet 4 and shins 5 of the passenger 2 through opening of the second vent hole 51 (step S18).

As described above, the knee airbag apparatus for the autonomous vehicle according to an aspect of the present disclosure includes the first cushion 20 and the second cushion 30 deployed toward the knees 3 of the passenger 2 and the third cushion 50 deployed toward the feet 4 and shins 5 of the passenger 2 according to the collision mode (head-on collision, offset collision or oblique collision) and the position (normal position or relaxation position) of the seat, thereby efficiently securing safety of the passenger seated on the seat located in the normal region and the passenger seated on the seat located in the relaxation region.

The knee airbag apparatus for the autonomous vehicle according to the present disclosure includes a first cushion and a second cushion deployed toward the knees of a passenger and a third cushion deployed toward the feet and shins of the passenger according to a collision mode (head-on collision, offset collision or oblique collision) and the position (normal position or relaxation position) of a seat, thereby efficiently securing safety of a passenger seated on a seat located in a normal region and a passenger seated on a seat located in a relaxation region.

Although aspects of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A knee airbag apparatus for an autonomous vehicle, comprising:
    an inflator operated by an airbag controller to generate airbag gas;
    a first cushion configured to deploy toward knees of a seated passenger by the airbag gas, and including a first vent hole formed on a first surface of the first cushion;
    a second cushion disposed between the first surface of the first cushion and the seated passenger and directly connected to the first surface of the first cushion; and
    a first active vent arranged on the first vent hole to close the first vent hole and configured to selectively open the first vent hole,
    wherein:
        when the first cushion is deployed and the first active vent closes the first vent hole, only the first cushion is deployed, and
        when the first cushion is deployed and the first active vent opens the first vent hole, the second cushion is deployed such that the first cushion and the second cushion are deployed with a time difference toward the knees of the seated passenger.

2. The knee airbag apparatus according to claim 1, further comprising:
    a third cushion connected to the first cushion and configured to fluidly communicate with the first cushion through a second vent hole formed on a second surface of the first cushion; and
    a second active vent arranged on the second vent hole to close the second vent hole and configured to selectively open the second vent hole,
    wherein:
        when the first cushion is deployed and the second active vent closes the second vent hole, the third cushion is not deployed, and
        when the first cushion is deployed and the second active vent opens the second vent hole, the third cushion is deployed.

3. The knee airbag apparatus according to claim 2, wherein the third cushion is deployed below the first cushion to protect feet and shins of the seated passenger.

4. The knee airbag apparatus according to claim 2, wherein the airbag controller is configured to receive signals from a collision detection sensor, a passenger detection sensor and a seat positioning mechanism and to control operation of the inflator, the first active vent and the second active vent.

5. The knee airbag apparatus according to claim 1, further comprising: an airbag controller configured to determine whether to open the first vent hole based on an occurrence of head-on collision, and a distance between the seated passenger and a crash pad of the autonomous vehicle.

6. The knee airbag apparatus according to claim 5, wherein the airbag controller is further configured to determine whether to open the first vent hole based on an occurrence of offset collision or oblique collision.

7. The knee airbag apparatus according to claim 2, further comprising: an airbag controller configured to determine whether to open the second vent hole based on a distance between the seated passenger and a crash pad of the autonomous vehicle, and an occurrence of offset collision or oblique collision.

8. The knee airbag apparatus according to claim 2,
    wherein the inflator is fixed to a crash pad of a driver seat,
    wherein the first cushion and the second cushion are deployed toward knees of a passenger seated on the driver seat, and
    wherein the third cushion is deployed toward feet and shins of the passenger seated on the driver seat.

9. The knee airbag apparatus according to claim 2,
    wherein the inflator is fixed to a glove box coupled to a crash pad of a passenger seat,
    wherein the glove box protrudes inward by operation of a glove box lifter when the inflator inflates,
    wherein the first cushion and the second cushion are deployed toward knees of a passenger seated on the passenger seat, and
    wherein the third cushion is deployed toward feet and shins of the passenger seated on the passenger seat.

* * * * *